(12) United States Patent
Valleroy et al.

(10) Patent No.: US 8,245,815 B2
(45) Date of Patent: Aug. 21, 2012

(54) CELLULAR-CORE STRUCTURE FOR AN ACOUSTIC PANEL

(75) Inventors: Laurent Valleroy, Le Havre (FR); Emmanuel Drevon, Aglesqueville l'Esneval (FR)

(73) Assignee: Aircelle (FR)

( * ) Notice: Subject to any disclaimer, the term of this patent is extended or adjusted under 35 U.S.C. 154(b) by 0 days.

(21) Appl. No.: 12/738,550

(22) PCT Filed: Sep. 10, 2008

(86) PCT No.: PCT/FR2008/001263
§ 371 (c)(1), (2), (4) Date: Apr. 16, 2010

(87) PCT Pub. No.: WO2009/066036
PCT Pub. Date: May 28, 2009

(65) Prior Publication Data
US 2010/0212998 A1 Aug. 26, 2010

(30) Foreign Application Priority Data
Oct. 16, 2007 (FR) .................................... 07 07247

(51) Int. Cl.
*E04B 1/82* (2006.01)
(52) U.S. Cl. .......... 181/292; 181/290; 181/284; 244/1 N
(58) Field of Classification Search .................. 181/292, 181/290; 244/1 N
See application file for complete search history.

(56) References Cited

U.S. PATENT DOCUMENTS

| | | | | |
|---|---|---|---|---|
| 5,445,861 A | * | 8/1995 | Newton et al. | 428/116 |
| 5,653,836 A | | 8/1997 | Minich et al. | |
| 6,209,679 B1 | * | 4/2001 | Hogeboom et al. | 181/286 |
| 6,371,242 B1 | * | 4/2002 | Wilson et al. | 181/292 |
| 6,615,950 B2 | * | 9/2003 | Porte et al. | 181/292 |
| 6,830,796 B2 | * | 12/2004 | Murray et al. | 428/73 |
| 6,871,725 B2 | * | 3/2005 | Johnson | 181/292 |
| 7,661,510 B2 | * | 2/2010 | Muller | 181/292 |
| 7,798,285 B2 | * | 9/2010 | Chiou et al. | 181/213 |
| 2002/0050420 A1 | * | 5/2002 | Porte et al. | 181/292 |
| 2004/0007422 A1 | * | 1/2004 | Porte et al. | 181/210 |

FOREIGN PATENT DOCUMENTS

| | | |
|---|---|---|
| EP | 0636780 A1 | 2/1995 |
| FR | 2261872 A1 | 9/1975 |
| WO | 2006047991 A1 | 5/2006 |

OTHER PUBLICATIONS

International Search Report PCT/FR2008/001263; Dated Jun. 2, 2009.

* cited by examiner

*Primary Examiner* — Forrest M Phillips
(74) *Attorney, Agent, or Firm* — Cantor Colburn LLP

(57) ABSTRACT

The invention relates to a cellular-core structure (10) that can be used in an acoustic panel for a turbojet nacelle, comprising at least one cellular unit (12; 14), each cellular unit (12; 14) comprising two end sheets (18; 20), the end sheets (18; 20) being joined together by joining elements (24) that are placed so as to form cellular cells (32). The subject of the invention is also a method of producing such a structure, an acoustic panel comprising such a structure, and a nacelle comprising such an acoustic panel.

13 Claims, 2 Drawing Sheets

CELLULAR-CORE STRUCTURE FOR AN ACOUSTIC PANEL

TECHNICAL FIELD

The present invention relates in particular to a cellular core structure formed of at least one cellular unit that can be used in an acoustic panel for a turbojet engine nacelle.

BACKGROUND

Aircraft turbojet engines generate significant amounts of noise pollution. There is a strong demand for this pollution to be reduced, especially since the turbojet engines used are becoming increasingly powerful. The design of the nacelle that surrounds a turbojet engine plays a significant part in reducing this noise pollution.

In order further to improve the acoustic performance of aircraft, nacelles are provided with acoustic panels the purpose of which is to attenuate the noise generated by the turbojet engine and the vibrations of the structures.

Acoustic panels are structures that are well known for absorbing these noises. These panels conventionally comprise one or more layers of cellular core structure (structure commonly known as "honeycomb"). These layers are generally coated on their lower surface, that is to say on their face not in contact with the flow of air through the nacelle, with an air-impermeable or "solid" skin and, on their upper surface, that is to say on the face in contact with the flow of air through the nacelle, with an air-permeable perforated skin known as the "acoustic" skin.

The acoustic panel may further comprise several layers of cellular core structure between which there is inserted, for example bonded, a porous or multi-perforated skin known as a "septum".

Such panels constitute acoustic resonators capable of "trapping" the noise and therefore of attenuating the noise emitted to the outside of the nacelle.

In a known way, the cellular core structure is created from (a) joined cellular unit(s) known as (a) "honeycomb block(s)". A cellular unit is generally obtained by superposing several sheets of metal, of light alloy or of composite, on which bonding means are positioned at discrete spots to bond the sheets together at certain points known as joining pads. The cellular unit thus produced is said to be in "compacted" form. In order to form the alveolar cells, the unit undergoes a stretching operation to separate the sheets which remain joined together at the joining pads. The cellular unit thus produced is then said to be in "expanded" form.

The acoustic properties of the acoustic panel, that is to say its noise absorption as a function of the frequency and acoustic level of the noise, are dependent notably on the joining of the cellular unit or units, which form a cellular core structure.

The lateral ends of cellular units are commonly joined using a foaming adhesive, such as the adhesive FM 410®, which has a high ability to expand. Adhesive, generally in the form of a film, is inserted between the adjacent edges of two cellular units and, as it expands, blocks the alveolar cells, creating additional thicknesses at the cell partitions in the joining region. These additional thicknesses have the disadvantage of reducing the effective acoustic area of the cellular structure and also of causing sharp breaks in impedance which play a part in reducing the acoustic performance of the acoustic panel by redistributing the modal energy of the noise through the rotating parts when the turbojet engine is operating.

Use of such a cellular core structure is complicated and does not allow fully uniform acoustic treatment to be obtained.

BRIEF SUMMARY

The disclosure provides a cellular core structure comprising one or more cellular units that is simple to implement and effectively attenuates the noise caused by the operation of the turbojet engine.

To this end, the subject of a first aspect of the invention is a cellular core structure able to be used in an acoustic panel for a turbojet engine nacelle comprising at least one cellular unit, each cellular unit comprising two end sheets, characterized in that the end sheets are joined together by joining pads positioned in such a way as to form alveolar cells.

The structure according to the invention comprises one or more cellular unit(s) joined together in such as way as not to obstruct the alveolar cells. Specifically, the joining region of the structure according to the invention is confined to the alveolar cells formed by the joining pads and the end sheets. As a result, no alveolar cell of the structure according to the invention is completely or partially blocked. On the contrary, the joining region exhibits new substantially air-filled alveolar cells and this increases the effective acoustic area of the structure according to the invention. Hence, the structure according to the invention advantageously permits an effective reduction in noise with no break in impedance.

From a mechanical standpoint, the structure of the invention offers superior mechanical strength to that of the structures of the prior art. Specifically, the structure according to the invention behaves like a non-jointed whole block made up of alveolar cells.

According to other features of the invention, the structure according to the invention has one or more of the following optional features considered alone or in any possible combination:

the joining pads are made of a material chosen from metals, alloys or polymers, notably an epoxy-based resin, making it possible to withstand the external stresses and not critically adding weight to the nacelle into which the structure according to the invention is intended to be incorporated;

the structure according to the invention has a surface that is substantially of revolution so as optimally to constitute an acoustic panel for a turbojet engine nacelle with a view to attenuating the acoustic disturbance originating from the turbojet engine.

The subject of a second aspect of the invention is a method of preparing a cellular core structure according to the invention, comprising at least one cellular unit, characterized in that it comprises the steps aimed at:

A—selecting at least one cellular unit in a substantially compacted and substantially flat form, each cellular unit comprising two end sheets;

B—joining the end sheets positioned facing one another using bonding means positioned on one end sheet in such a way as to form substantially compacted alveolar cells;

C—stretching the structure obtained at the outcome of step (B) using expansion means in order to form the substantially expanded alveolar cells.

What is meant here by "substantially compacted form" are cellular units in which the alveolar cells have not been formed but can be so once these cells have been stretched.

What is meant here by "compacted alveolar cells" is substantially flattened alveolar cells that can be expanded after stretching.

What is meant here by "expanded alveolar cells" is stretched alveolar cells able to form acoustic attenuation means.

The method according to the invention has the advantage of being simple to implement in as much as the cellular unit(s) is (are) first of all handled in compacted form then stretched as one in another step in order to form the structure according to the invention.

In addition, the method according to the invention has the advantage of providing a cellular core structure that may have non-uniform alveolar cells. Specifically, the expansion means may stretch the structure from the outcome of step B of the method according to the invention non-uniformly.

According to other features of the invention, the method according to the invention has one or more of the following optional features considered alone or in any possible combination:

- the method according to the invention further comprises a step (D) in which a perforated acoustic skin and/or a non-perforated skin is/are attached to at least one face of the cellular core structure obtained at the outcome of step (C), making it possible to protect the structure according to the invention and increase the acoustic attenuation;
- the bonding means comprise a polymer, of metal or of alloy used for welding, giving the structure according to the invention good mechanical strength;
- the bonding means consist of a material the position and thickness of which are such that the bonding means create a non-negligible air-filled space between two end sheets, allowing the alveolar cells to be formed, these cells, which ideally are hexagonal, being able to adopt degraded geometries while at the same time performing their acoustic attenuation function;
- the expansion means are mechanical means able to stretch the structure obtained at the outcome of step (B) in a direction that is substantially perpendicular or radial to the internal and external faces, allowing the structure from the outcome of step (B) to be stretched finely to the desired shape;
- in step B, the end sheets are joined edge to edge in such a way as to obtain a structure which has a surface substantially of revolution, allowing an acoustic attenuation panel, particularly a turbojet engine air inlet acoustic panel, to be produced in an optimal way.

The subject of a third aspect of the invention is an acoustic panel for a nacelle, comprising at least one cellular core structure according to the invention or that can be obtained using the method according to the invention.

According to a preferred embodiment, the acoustic panel comprises several cellular core structures arranged in layers between which a multi-perforated or porous skin, preferably a septum, is located.

The subject of a fourth aspect of the invention is a turbojet engine nacelle comprising an acoustic panel according to the invention.

BRIEF DESCRIPTION OF THE DRAWINGS

The invention will be further understood from reading the nonlimiting description which follows, given with reference to the attached figures listed hereinbelow:

FIG. 1b is an enlargement of region Z of FIG. 1a;

FIG. 1a illustrates one embodiment of a cellular core structure 10 according to the invention intended to be used in an acoustic panel for nacelle of a turbojet engine, these not having been depicted.

DETAILED DESCRIPTION

The structure 10 of the invention may comprise a cellular unit joined to itself or of a plurality of cellular units, notably two or three, joined together edge to edge.

Figure 1A:
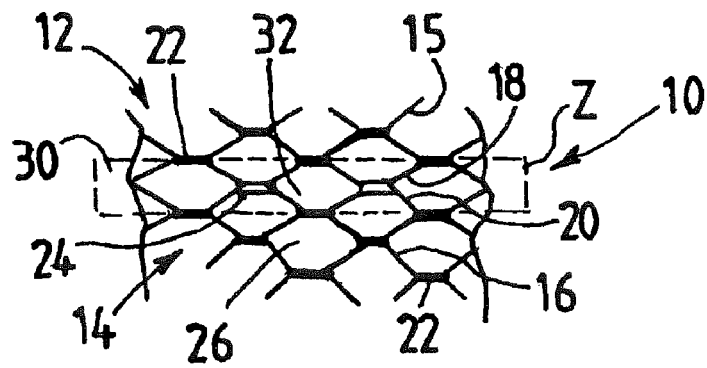
FIG. 1a is a partial schematic cross section of the structure according to the invention.

According to the embodiment depicted in FIG. 1a, the structure 10 according to the invention includes two cellular units 12 and 14.

The cellular units 12 and 14 typically comprise intermediate sheets 15 and 16 and two end sheets, of which one, 18, 20 of each cellular unit 12, 14, is depicted, as well as joining pads 22 and 24. The end sheets 18 and 20 are joined together by the joining pads 24 positioned, notably at discrete spots, over extensive or even substantially continuous regions so as to form alveolar cells. In general, the sheets 15 and 16 form the cell walls of the alveolar cells 26, the vertices of which are situated at the joining pads 22.

Figure 1B:
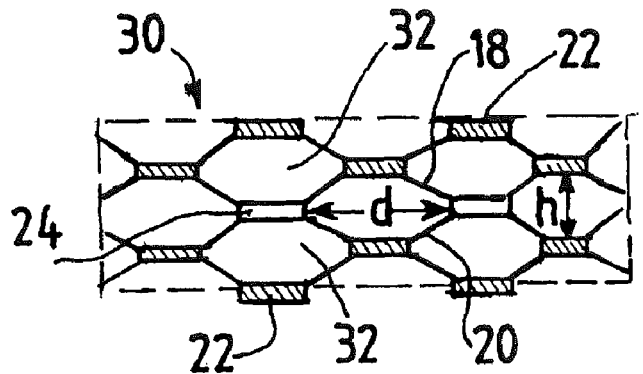

As illustrated in FIG. 1b, the joining region 30 where the cellular units 12 and 14 are joined together is formed of alveolar cells 32 originating from the spotwise joining of the end sheets 18 and 20 at the joining pads 24. Thus, advantageously, not only do the alveolar cells 32 contribute, like the other alveolar cells 26, toward attenuating the noise of the structure 10 according to the invention because they are neither obstructed nor blocked, but these alveolar cells 32 also increase the noise attenuation capability of the structure 10 according to the invention.

The alveolar cells 26 and 32 are, for example, alveolar cells of geometric, notably hexagonal, or alternatively curved, shape.

According to one embodiment, the alveolar cells 26 and 32 are of uniform shape. The alveolar cells 26 and 32 typically have a width d of between 3 mm and 40 mm, notably between 8 mm and 12 mm and a height h notably of between 3 mm and 100 mm, notably between 8 mm and 40 mm.

In general, the alveolar cells 26 and 32 are free of material and typically filled with air.

The joining pads 24 preferably comprise a material chosen from metals, alloys or polymers, notably an epoxy-based resin.

The intermediate sheets 15 and 16 and the end sheets 18 and 20 are made of a material resistant to the external stresses and which do not critically add weight to the nacelle into which the structure 10 according to the invention is intended to be incorporated. According to one advantageous embodiment, the intermediate sheets 15 and 16 and the end sheets 18 and 20 are made of the same material. For preference, the intermediate sheets 15 and 16 and the end sheets 18 and 20 are made of a material chosen from metals, light alloys and thermoplastic polymers, notably aluminum, titanium and composite.

Furthermore, the joining pads 24 may have a thickness notably greater than that of the end sheets 18 and 20. According to one embodiment, the end sheets 18 and 20 have a thickness substantially equal to the intermediate sheets 15 and 16, notably ranging between 10 µm and 200 µm.

Typically, the thickness of the joining pads 24 ranges between 5 µm and 1 mm, notably between 0.1 mm and 0.4 mm.

Typically, the thickness of a unit 12 and 14 corresponds to that of the structure 10 according to the invention and notably ranges between 3 mm and 100 mm or alternatively between 8 mm and 40 mm.

Figure 2:
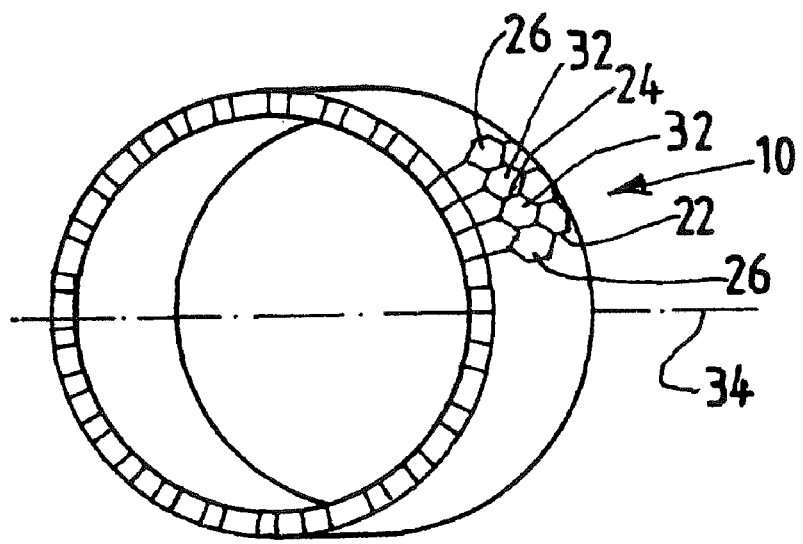
FIG. 2 is a perspective view of one embodiment of the structure according to the invention.

In general, the structure 10 according to the invention has a suitable shape for forming a turbojet engine nacelle acoustic panel so as best to attenuate the acoustic disturbance from this turbojet. According to the embodiment depicted in FIG. 2, the structure 10 has a surface substantially of revolution of axis 34. According to other embodiments that have not been depicted, the structure 10 according to the invention is not of uniform shape and is, for example, in the form of a non-uniform "barrel", namely the radius of the cross section is not constant either lengthwise or radially with respect to the axis of revolution 34 of the structure 10 according to the invention. This geometry typically corresponds to a turbojet engine air inlet acoustic duct.

The method according to the invention advantageously comprises three steps A, B and C, which are simple to implement in order to prepare the structure 10 according to the invention.

Figure 3A:
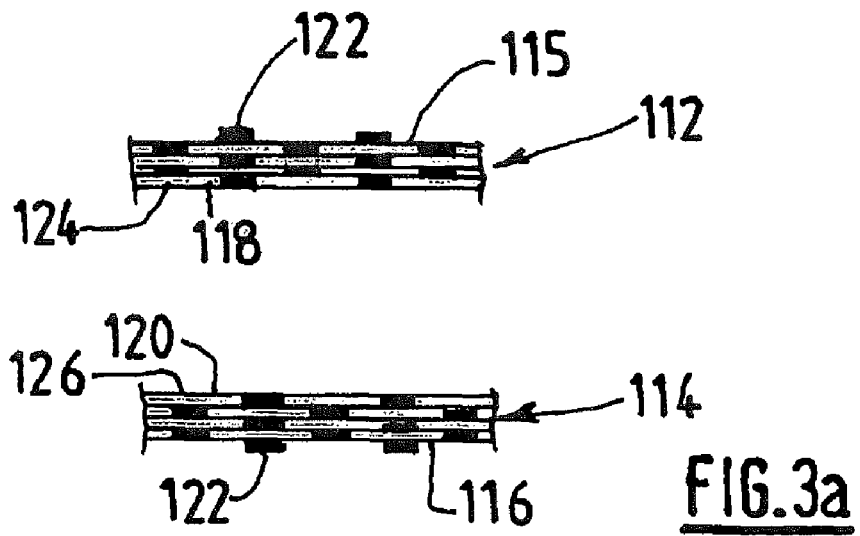
FIGS. 3a to 3c are schematic and partial cross sections of embodiments of the steps of the method according to the invention.

Thus, FIG. 3a illustrates one embodiment of step A of the method according to the invention, in which at least one cellular unit is selected, two cellular units 112 and 114 being depicted here, in substantially compacted and substantially flat form. Each cellular unit 112 and 114 typically comprises two end sheets, of which one from each cellular unit 112, 114 has been depicted as 118, 120 respectively, intermediate sheets 115 and 116 and joining pads 122 located between the intermediate sheets 115 and 116.

The end sheets 118 and 120 have a free surface 124 and 126 that can be joined and on which bonding means are intended to be positioned.

Figure 3B:
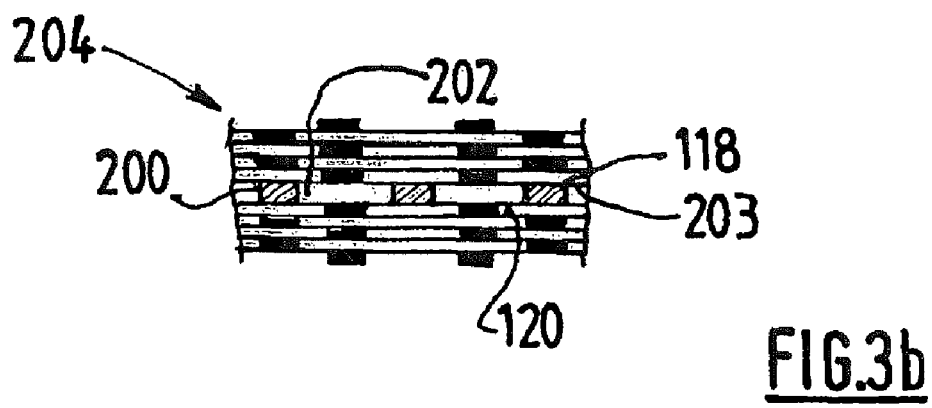

In one embodiment of step B of the method according to the invention depicted in FIG. 3b, the end sheets 118 and 120 facing one another are joined together by bonding means 200 positioned on one of the end sheets 118 or 120 so as to form substantially compacted alveolar cells 202. By way of example, the bonding means 200 may be positioned on one of the end sheets 118 or 120 at discrete spots, over extensive regions or even substantially continuously.

According to one embodiment that has not been depicted, one of the two isolated units 112 or 114 may have, on the free surface of its end sheet 118 or 120 that is intended to be joined, bonding means positioned beforehand in step B.

The bonding means 200 typically comprise material the position and thickness of which are such that these bonding means 200 create a non-negligible air-filled space 203 between two end sheets 118 and 120, making it possible to form alveolar cells. This space 203 has a thickness substantially equal to the thickness of the bonding means 200. The bonding means 200 is preferably composed of polymers, of metal or of alloy used for welding.

At the end of bonding, the bonding means 200 become joining pads which, with the end sheets 118 and 120, delimit substantially compacted alveolar cells 202.

Obtained at the outcome of this step B is a structure 204 comprising an internal face, not depicted, intended to be closest to the axis of the engine, not depicted, and an external face, not depicted, intended to be furthest from the axis of the engine.

According to one preferred embodiment, in step B, the end sheets 118 and 120 are joined together edge to edge to obtain a structure 204 with a surface substantially of revolution, notably substantially cylindrical or barrel-shaped. When the structure 204 has a surface of revolution, the internal face is intended to be radially closest to the axis of the engine, not depicted, and the external face is intended to be radially furthest from the axis of the engine.

Figure 3C:
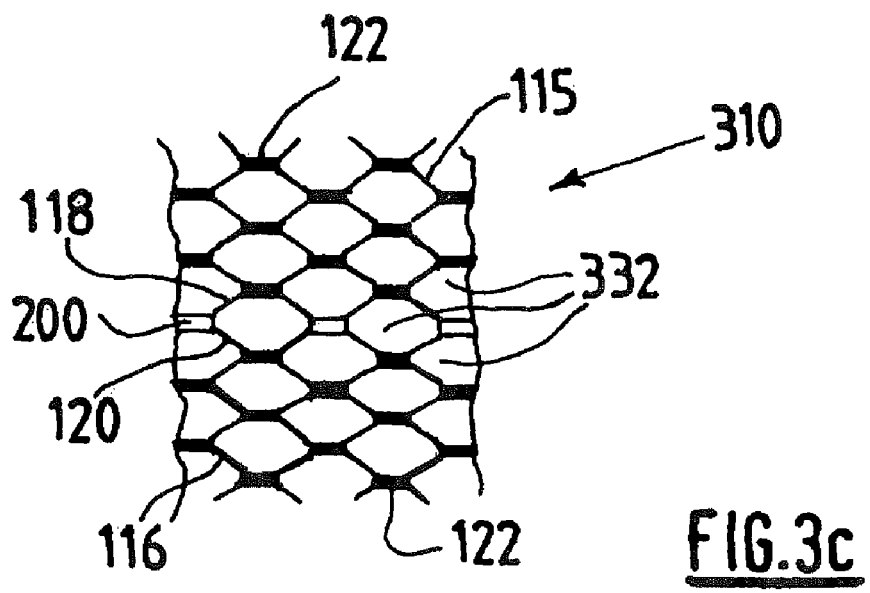

In one embodiment of step C of the method according to the invention, depicted in FIG. 3c, the structure 204 obtained in step B is stretched by an expansion means to form the expanded alveolar cells 332 in order to obtain the cellular core structure 310 according to the invention. For preference, the expansion means are mechanical means, not depicted, able to stretch the structure 204 in a direction radial or perpendicular to the internal and external faces of the structure 204.

Whilst it is possible to stretch the structure 204 non-uniformly so as to have alveolar cells 332 of different sizes and to do so with a view to forming a one-piece cellular core with a non-developable surface, typically applied to a turbojet engine air inlet acoustic duct.

According to one preferred embodiment that has not been depicted, the method according to the invention further comprises a step D in which a perforated acoustic skin and/or a non-perforated or solid skin is/are attached to at least one face of the structure 310 obtained at the outcome of step C.

The acoustic skin is generally perforated substantially uniformly.

The acoustic skin and the solid skin are usually made of a multi-layer composite material comprising a reinforcing fiber impregnated with a polymerized resin.

In addition, the acoustic panel may further comprise several structures 10 according to the invention or 310 obtained according to the method of the invention, arranged in layers between which there is a porous or multi-perforated skin, preferably a septum, with a view to forming a multi-stage resonator.

In general, the septum is made up of a porous layer or of a skin that is microperforated with holes of a diameter ranging between 0.1 mm and 1 mm.

The acoustic panel is then assembled by arranging the various layers, namely the internal acoustic skin, the structure(s) 10 according to the invention or 310 obtained according to the invention, septum and solid skin, if any, coated with adhesive, over a mold with the required shape. The whole undergoes an assembly operation so as to compact the layers and form an integral sandwich structure using, for example, an autoclave to polymerize the adhesives.

The solid skin may be produced in a single operation and bonded onto the acoustic panel.

The invention claimed is:

1. A cellular core structure able to be used in an acoustic panel for a turbojet engine nacelle comprising at least one cellular unit, each cellular unit comprising at least one intermediate sheet and two end sheets, wherein said cellular core structure includes a surface that is substantially of revolution, said surface being made by joining together edge to edge end sheets of a cellular unit or several cellular units by joining pads positioned in such a way as to form alveolar cells.

2. The structure as claimed in claim 1, wherein the joining pads are made of a material comprising at least one of metals, alloys, polymers, and an epoxy-based resin.

3. An acoustic panel for a nacelle, comprising at least one cellular core structure as claimed in claim 1.

4. The acoustic panel as claimed in claim 3, wherein it comprises several cellular core structures arranged in layers between which a multi-perforated or porous skin is located.

5. A turbojet engine nacelle comprising an acoustic panel, wherein the acoustic panel is as claimed in claim 3.

6. A method of preparing a cellular core structure as claimed in claim 1, comprising at least one cellular unit, comprising:

A—selecting at least one cellular unit in a substantially compacted and substantially flat form, each cellular unit comprising at least one intermediate sheet and two end sheets, wherein said cellular core structure includes a surface that is substantially of revolution;

B—joining the end sheets of a cellular unit or several cellular units edge to edge and positioned the end sheets to face one another using bonding means positioned on one end sheet in such a way as to form substantially compacted alveolar cells;

C—stretching the structure obtained at the outcome of step (B) using expansion means in order to form the substantially expanded alveolar cells.

7. The method as claimed in claim 6, further comprising a step (D) in which at least one of a perforated acoustic skin and a non-perforated skin are attached to at least one face of the cellular core structure obtained at the outcome of step (C).

8. The method as claimed in claim 6, wherein the bonding means comprise a polymer, of metal or of alloy used for welding.

9. The method as claimed in claim 6, wherein the bonding means comprise a material the position and thickness of which are such that the bonding means create a non-negligible air-filled space between two end sheets.

10. The method as claimed in claim 6, wherein the expansion means are mechanical means able to stretch the structure obtained at the outcome of step (B) in a direction that is substantially perpendicular or radial to internal and external faces.

11. An acoustic panel for a nacelle, comprising at least one cellular core structure obtained by the method as claimed in claim 6.

12. The acoustic panel as claimed in claim 11, wherein it comprises several cellular core structures arranged in layers between which a multi-perforated or porous skin is located.

13. A turbojet engine nacelle comprising an acoustic panel, wherein the acoustic panel is as claimed in claim 11.

\* \* \* \* \*